United States Patent
Pascault et al.

(10) Patent No.: US 6,586,097 B1
(45) Date of Patent: Jul. 1, 2003

(54) CROSS-LINKED MICROPARTICLES, METHOD FOR THE PRODUCTION AND USE THEREOF

(75) Inventors: Jean-Pierre Pascault, Villerubanne (FR); Ludovic Valette, Haguenau (FR); Benoit Magny, Verneuil en Halatte (FR)

(73) Assignee: Cray Valley, S.A., Puteaux (FR)

( * ) Notice: Subject to any disclaimer, the term of this patent is extended or adjusted under 35 U.S.C. 154(b) by 0 days.

(21) Appl. No.: 09/937,537

(22) PCT Filed: Mar. 24, 2000

(86) PCT No.: PCT/FR00/00739

§ 371 (c)(1),
(2), (4) Date: Dec. 12, 2001

(87) PCT Pub. No.: WO00/59951

PCT Pub. Date: Oct. 12, 2000

(30) Foreign Application Priority Data

Mar. 31, 1999 (FR) .............................. 99 04041

(51) Int. Cl.$^7$ ................................. B32B 5/16
(52) U.S. Cl. ............ 428/402; 428/402.21; 428/402.72; 428/407; 525/518; 525/70; 525/73; 524/504
(58) Field of Search ........................... 428/402, 402.21, 428/402.22, 407; 525/518, 70, 73; 524/504

(56) References Cited

U.S. PATENT DOCUMENTS

| 4,206,099 A | 6/1980 | Bentley et al. ........... 522/295.5 |
| 4,605,720 A * | 8/1986 | Chattha et al. | |

FOREIGN PATENT DOCUMENTS

| GB | 2178048 | * | 2/1987 |
| WO | 98/28286 A2 | | 7/1998 |
| WO | 98/28287 | | 7/1998 |
| WO | 98/28286 A3 | | 8/1998 |

OTHER PUBLICATIONS

Chemical Abstract: XP–002123686: Nonaqueous Resin Dispersions, Nov. 1985.

Chemical Abstract: XP–0021323687: Nonaqueous Emulsions of Acrylic Polmers, Jun. 1981.

(List continued on next page.)

*Primary Examiner*—Leszek Kiliman
(74) *Attorney, Agent, or Firm*—Whyte Hirschboeck Dudek SC

(57) ABSTRACT

These crosslinked microparticles between 10–300 nm in size are obtained by dispersion polymerization, in non-aqueous medium which is non-solvent for the polymer formed, of a composition of ethylenically unsaturated polymerizable compounds, comprising:

Figure 1:
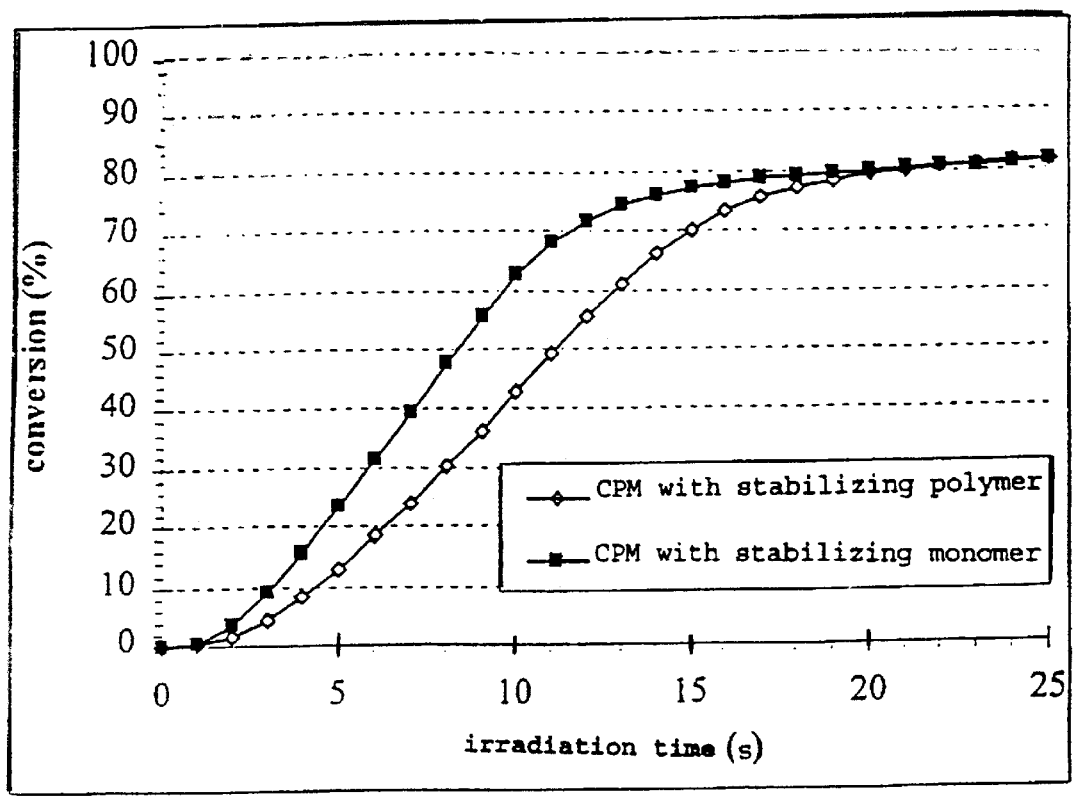

at least one monomer A, comprising only one ethylenic unsaturation, giving the microparticles formed in the said non-aqueous medium self-stabilization during and after polymerization, without any addition of polymer having the function of a stabilizing agent, tither before, during or after polymerization, at least one compound B comprising at least two ethylenic unsaturations and optionally, depending on the case:

at least one compound C comprising only one ethylenic unsaturation and/or at least one compound D which is different from A, B and C and comprising at least one ethylenic unsaturation which can undergo radical-mediated polymerization and at least one second reactive function f1 which is other than an ethylenic unsaturation.

35 Claims, 1 Drawing Sheet

OTHER PUBLICATIONS

Liang, Liang, et al., *Cross–Linking Self–Emulsifying Copolymerization of an Unsaturated Polyester and Styrene*, Macromolecules, 1996, vol. 29, pp. 8650–8655.

Moad, Graeme, et al., *Other Initiating Systems*, Comprehensive Polymer Science, The Synthesis, Characterization, Reactions & Applications of Polymers, 1989, vol. 3, pp. 141–146, Pergamon Press.

Reactions & Applications of Polymers, 1989, vol. 3, pp. 141–146, Pergamon Press.

Funke, W., et al., *Microgels—Intramolecularly Crosslinked Macromolecules with a Globular Structure*, Advances in Polymer Science, 1998, vol. 136, pp. 139–234.

* cited by examiner

CROSS-LINKED MICROPARTICLES, METHOD FOR THE PRODUCTION AND USE THEREOF

This invention relates to crosslinked microparticles defined by the process for producing them by dispersion polymerization in non-aqueous medium without using a polymeric stabilizer, to the associated process and to their uses in coating and moulding compositions, as reactive or non-reactive additives, and as regulators of the rheology and/or reinforcement and/or flexibilization of the host matrix.

Crosslinked microparticles, such as those described in the present invention, are also commonly denoted by the term "microgels". These microgels are essentially characterized by a globular structure (from a new nm to a few microns) of a polymer of very high mass comprising intramolecular crosslinking nodes. Advances in Polymer Science (1998) vol. 136, pp. 139–234 presents a general bibliographical review of microgels, methods for preparing them and a number of applications.

The methods most commonly used for preparing crosslinked microparticles or microgels are, on the one hand, emulsion polymerzation in aqueous medium, and, on the other hand, dispersion polymerization in non-aqueous medium, of compositions of polymerizable compounds comprising, inter alia, a polymerizable compound having the function of a crosslinking agent. In both cases, the polymerization medium is non-solvent for the polymer formed, which precipitates in the form of polymer particles. The essential problem posed for these two preparation methods is the need to stabilize the particles formed during the polymerization in order to protect them against the strong interparticulate interactions which may lead, if they are not controlled, to aggregation and setting to a solid of the particles formed. This stabilization is an essential key parameter in controlling the size of the microparticles, in particular in the range below one micron. Most of the performance quality of the microparticles is directly associated with their specific structure and their size.

The steric stabilizers commonly used to prepare microgels by emulsion or by dispersion are essentially of polymeric structure, well defined and adapted to each case, according to the polymerization medium and the structure of the particle to be stabilized. Macromolecules 1996, 29, 8650–55 in particular describes microgels based on unsaturated polyesters of specific self-emulsifying structure (self-stabilized particles). U.S. Pat. No. 4,206,099 describes crosslinked microparticles obtained by polycondensation in non-aqueous medium, using grafted copolymers as steric stabilizers. U.S. Pat. No. 4,605,720 describes crosslinked acrylic macroparticles obtained by radical-mediated polymerization in dispersion in non-aqueous medium, using polymeric stabilizers.

Among the essential drawbacks of the crosslinked microparticles obtained with stabilizers of polymeric structure, mention may be made of:

the limited availability of the polymeric stabilizer adapted to each individual case as a function of the polymerization medium and the structure of the particle to be stabilized, which often requires the specific prior preparation of the stabilizing polymer in an additional separate step, thus complicating the method for gaining access to the target microparticles.

relatively high concentrations of stabilizing polymer are required to obtain particle sizes of less than one micron, which often poses problems of solubility of the polymer and of viscosity of the corresponding solution with a limitation on the choice of the couples [stabilizing polymer/solvent for the stabilizing polymer and the monomers, and non-solvent for the polymer of the particles formed].

although the high molecular mass and concentration of the stabilizing polymer are favourable to the steric stabilization of the particles formed during the polymerization, this presence of a steric barrier as an outer layer can pose problems of accessibility of the protected structure of the particle, thus creating, depending on the case, a reduction in the efficacy of the reactive functions borne by the particle or incompatibility with respect to the receiving moulding or coating composition, with negative repercussions on the final performance qualities of the coating or of the moulded product.

certain specific microparticle structures are difficult if not impossible to obtain given the fact that the essential presence of the stabilizing polymer automatically limits the possibilities in terms of the structure of the particle (core/shell/effective functionality) and the desirable physicochemical properties of the microparticle relative to the medium and to the intended application.

The present invention proposes to overcome these drawbacks in a simple manner with crosslinked microparticles between 10 and 300 nm in size, preferably between 10 and 200 nm and more particularly from 20 to 100 nm in size, obtained by dispersion polymerization, in non-aqueous medium which is non-solvent for the polymer formed, of a composition of ethylenically unsaturated polymerizable compounds, the said microparticles being characterized in that the said composition comprises:

at least one monomer A, comprising only one ethylenic unsaturation which can undergo radical-mediated polymerization, giving the microparticles formed in the said non-aqueous medium self-stabilization during and after polymerization, without any addition of polymer having the function of a stabilizing agent, either before, during or after polymerization, at least one compound B comprising at least two ethylenic unsaturations which can undergo radical-mediated polymerization, and optionally, depending on the case:

at least one compound C comprising only one ethylenic unsaturation which can undergo radical-mediated polymerization, which is different from A and/or at least one compound D which is different from A, B and C and comprising at least one ethylenic unsaturation which can undergo radical-mediated polymerization and at least one second reactive function f1 which is other than an ethylenic unsaturation.

The crosslinked microparticles of the present invention are obtained by radical-mediated dispersion polymerization, in non-aqueous medium which is non-solvent for the polymer formed, of a composition of ethylenically unsaturated polymerizable compounds comprising the compounds A, B, C and D as defined above, in the absence of any added polymer for stabilizing the microparticles, formed during the polymerization, either before, during or after the dispersion polymerization.

The compounds A are necessarily monomers with only one ethylenic unsaturation which can undergo radical-mediated polymerization, while the compounds B, C and D can be monomers and/or oligomers. These oligomers have molecular masses $\overline{Mn}$ of less than 2500 and preferably less than 1500.

The monomers A giving the microparticles formed self-stabilization as defined above can be selected from monomers containing only one ethylenic unsaturation which can undergo radical-mediated polymerization, with a molecular mass $\overline{Mn}$ of less than 600 and preferably less than 400, containing only one polymerizable ethylenic unsaturation selected from (meth)acrylates, maleates and vinyls and borne by a linear or branched aliphatic group or a substituted or unsubstituted monocyclic or polycyclic alicyclic group which can optionally bear at least one reactive function f2 which is different from the polymerizable ethylenic unsaturation. In general, the stabilizing function of the monomer A is associated with an adequacy of the solubility parameter of this monomer relative to that of the polymerization medium and that of the polymer formed. The term "(meth) acrylate" should be interpreted throughout as "acrylate and/or methacrylate".

Preferably, the monomers A have a chemical structure corresponding to the general formula (I) below:

with $R_1$=H, $CH_3$

X=ester —(C=O)O—, amide —(C=O)N($R_3$)—

Y=ester —O(O=C)—, amide —($R_3$)N(C=O)—, urethane —O(O=C)NH—

$R_2$=$C_2$–$C_6$ alkylene radical which can be substituted with functional groups such as OH $R_3$=$C_1$–$C_6$ alkyl, H k=0 or 1

R=linear or branched $C_8$–$C_{22}$ alkyl or alkenyl radical or $C_8$–$C_{22}$ aralkyl radicals substituted on the aromatic ring, or substituted or unsubstituted $C_6$–$C_{22}$ acyclic, monocyclic or polycyclic radical which can comprise a reactive function f2 selected from: carboxylic acid or anhydride, hydroxyl, epoxy, isocyanate, silane.

The preferred monomers A of formula (I) correspond to R chosen from: isobornyl, lauryl, octadecyl, isodecyl, tridecyl, docosanyl, dicyclopentadienyl, cyclohexyl or a $C_8$–$C_{22}$ alkyl or cycloaliphatic group bearing a carboxylic acid or anhydride, hydroxyl, epoxy, isocyanate or silane reactive function f2. As examples of monomers A bearing a carboxylic acid function f2, mention may be made of mono(meth) acrylated derivatives of succinic anhydride substituted with a linear or branched $C_6$–$C_{22}$, preferably $C_6$–$C_{18}$, alkyl or alkenyl, obtained by reacting the alkyl-substituted or alkenyl-substituted anhydride with a hydroxyalkyl (meth) acrylate containing a $C_2$–$C_6$ and preferably $C_2$ or $C_3$ hydroxyalkyl group. As examples of monomers A bearing a hydroxyl function f2, mention may be made of mono(meth) acrylated derivatives of hydroxystearic acid, obtained by reaction of hydroxystearic acid with glycidyl methacrylate or Cardura E10 (meth)acrylate. An epoxy function f2 can be introduced, for example epoxidized dicyclopentadiene (meth)acrylate, epoxidized vinylnorbornene (meth)acrylate or (meth)acrylates comprising a cycloaliphatic epoxy, as described in WO 98/28286, or an epoxidized unsaturated fatty acid (meth)acrylate. A function f2 can be introduced with a mono(meth)acrylate derived from the reaction between a cycloaliphatic or aliphatic $C_6$–$C_{12}$ diisocyanate with a hydroxyalkyl (meth)acrylate containing a $C_2$–$C_6$ alkyl.

The molar content of monomers A in the final microparticles obtained can range from 5% to 99% depending, on the one hand, on the nature of the monomer A, and, on the other hand, on the role fulfilled either as a simple monomer for stabilizing a variable composition based on compounds B, C and D, or as both a stabilizing monomer and a predominant base component of the target microparticles. Consequently, the molar percentage will be limited only by the desired performance qualities of the microparticles to be obtained. In general, the self-stabilizing effect is sufficient in a range extending from 5 mol % to 80 mol % and as a function of the monomer A chosen. The monomers A have, by the definition of their function, the specificity of preferentially binding to the outer layer of the microparticles and more specifically to the surface of these microparticles. This point is important in particular when the monomer A bears a reactive function f2 as defined above. The reason for this is that, in this case, the specificity of the monomer A allows it to bind the reactive function f2 specifically to the surface of the microparticle, thus even more significantly enhancing its accessibility and its overall reactivity relative to the same functions borne by the compounds D bearing functions f1, these functions f1 being distributed randomly throughout the volume of the microparticle, with a less ready accessibility of the functions in the core of the microparticle than at the surface. If more than one monomer A bearing functions f2 is used, the different functions f2 should not react together or with the functions f1 of the compounds D, during the polymerization.

The compounds B comprise at least two ethylenic unsaturations and serve as agents for crosslinking the microparticles formed. B is an essential component of the composition of the polymerizable compounds. They are essentially ethylenically multifunctional monomers and/or oligomers with a functionality, in terms of unsaturations which can undergo radical-mediated polymerization, of at least two. In the case of the monomers, the functionality, as defined above, can preferably range from 2 to 6. As examples of such monomers, mention may be made of: di(meth)acrylates of ethylene glycol, of propylene glycol, of butanediol, of 2-methylpropanediol, of neopentyl glycol, of hexanediol, of zinc and/or of calcium or substituted or unsubstituted divinylbenzenes, tri(meth)acrylates of glycerol, of trimethylolpropane and/or of alkoxylated derivatives, tri- or tetra (meth)acrylates of pentaerythritol and penta- or hexa(meth) acrylates of dipentaerythritol. The multifunctional oligomers have a functionality which can range from 2 to 50 and preferably from 2 to 20 and a molecular mass $\overline{Mn}$ of less than 2500, preferably less than 1500. The functionality and $\overline{Mn}$ are set as a function of the desired crosslinking density. The lower the value of $\overline{Mn}$ and the higher the functionality and the higher the crosslinking density of the microparticles. As examples of such oligomers, mention may be made of (meth)acrylic esters of polyol oligomers based on polyethers, comprising ether units chosen from oxyethylene and/or oxypropylene and/or oxytetramethylene, or based on saturated polyesters, or based on unsaturated polyurethanes or polyesters, or (meth)acrylated acrylic oligomers which can be obtained, for example, either by (meth)acrylation of (meth)acrylic copolymers based on glycidyl methacrylate with (meth)acrylic acid, or by (meth)acrylation of (meth) acrylic copolymers based on (meth)acrylic acid with glycidyl methacrylate.

The molar content of the compound B can range from 0.02% to 30% and preferably from 0.5% to 15%. The limitation of this content is important since, beyond a limiting content, the probability of chemical bridging between microparticles becomes significant, with, as a consequence, a large risk of destabilization, aggregation and sedimentation of the microparticles.

The compounds C are monomers different from the monomers A as defined above and/or oligomers, bearing only one ethylenic unsaturation which can undergo radical-mediated polymerization, and are components for adjusting the base composition as a function of the intended properties of the microparticles which can vary and be adapted according to each specific application. They are preferably selected from (meth)acrylic monomers such as methyl, ethyl, propyl, butyl, tert-butyl or 2-ethylhexyl (meth)acrylates, or vinylaromatic monomers such as styrene or vinyltoluenes or vinyl esters such as vinyl acetate or (meth)acrylated oligomers with an $\overline{Mn}$ of less than 2500 and more particularly less than 1500, such as (meth)acrylates of monofunctional alcohol oligomers. The preferred (meth)acrylate oligomers are polyalkoxylated monoalcohol (meth)acrylates, comprising alkoxy units chosen from oxyethylene and/or oxypropylene and/or oxytetramethylene, or (meth)acrylates derived from monoalcohols based on polycaprolactone, or on polyesters or polyurethanes. The presence of these compounds is optional depending on the structure and the performance qualities desired for the microparticles to be obtained. Monomers or oligomers of this type can adjust the mechanical performance qualities of the microparticles in terms of hardness or flexibility of the particle core as a function of the Tg temperatures corresponding to the glass transition. For example, a combination of structures with a high Tg, such as methyl methacrylate and/or styrene, with structures with a low Tg, such as butyl acrylate, makes it possible to obtain, as a function of the adjusted proportions, microparticles with a predominant nature ranging from the hardest to the softest. This type of structure is particularly advantageous in the reinforcement of a soft matrix or the flexibilization of a hard matrix or in the search for a hardness/flexibility compromise for applications in coatings or moulding compositions, in particular thermosetting compositions. Their molar content can range from 0 to 80% depending on the desired structure of the final microparticle.

The compounds D are monomers, different from A or B or C, and/or oligomers, different from B or C, bearing at least one ethylenic unsaturation which can undergo radical-mediated polymerization and at least one second reactive function f1 which is different from the ethylenic unsaturation. These functionalized monomers or oligomers bear reactive functions f1 selected from: carboxylic acid or anhydride, hydroxyl, epoxy, isocyanate, silane, amine or oxazoline. Without limitation, the following examples of possible compounds D may be mentioned:

when the function f1 is a carboxylic acid: (meth)acrylic, maleic, fumaric or itaconic acid when f1 is an anhydride function: maleic or itaconic anhydride when f1 is a hydroxyl: hydroxyalkyl (meth)acrylates containing a $C_2$–$C_4$ hydroxyalkyl such as hydroxyethyl, hydroxypropyl or hydroxybutyl, or mono(meth)acrylates of polycaprolactone or of diols, such as: polyether diols comprising ether units chosen from oxyethylene and/or oxypropylene and/or oxytetramethylene, polyester diols or polyurethane diols, with an $\overline{Mn}$ of less than 2500 and preferably less than 1500 when f1 is an epoxy function: glycidyl methacrylate or an alkoxylated glycidyl (meth)acrylate as described in WO 98/28287 when the function f1 is an isocyanate: isocyanatoethyl (meth)acrylate or the mono(meth)acrylate of a urethane isocyanate derived from the condensation of a ($C_2$–$C_6$) hydroxyalkyl (meth)acrylate with an aromatic diisocyanate such as toluene diisocyanate (TDI)

when f1 is a silane function, it can be used in the form of trialkyl- or trialkoxysilane borne by a monomeric or oligomeric (meth)acrylic derivative when f1 is an amine function: tert-butylaminoethyl methacrylate or dimethylaminoethyl methacrylate when f1 is an oxazoline function: oxazoline (meth)acrylates and more particularly 2-(5-methacryloylpentyl)-1,3-oxazoline.

In general, the functions f1 borne by at least one compound D can be different, but they should not react with each other or with any functions f2 borne by the monomers A, during the polymerization.

The choice of the compound D and of its reactive function and the molar content will depend essentially on the reactive system of application and on the composition and functionality of this system. The molar content can thus range from 0 for unreactive systems to 80% for highly reactive systems.

It is obvious to those skilled in the art that these functions should not interact with the polymerization medium, in order for these reactive functions to be preserved. One means of preserving the functions f1 liable to interact with the polymerization medium is to block the function f1 with a blocking agent, with possible deblocking of f1 after polymerization, in the same context as a chemical modification of the functions f1 after the polymerization step. Such a preventive blocking and subsequent deblocking is well known to those skilled in the art.

The functions f1 borne initially by the compound D and/or the functions f2 which may be borne by the monomer A can be modified after polymerization into functions f3 and f4, respectively, by chemical reaction in one or more steps with suitable reagents. For example, the introduction of a final (meth)acrylate function f4 may take place either starting with an epoxy function f1 by reaction with (meth)acrylic acid, or starting with a carboxylic acid f1 by reaction with glycidyl (meth)acrylate or hydroxyethyl (meth)acrylate. These latter reactions can also be used to introduce acrylic functions f3 specifically at the surface of the microparticle, starting with possible initial carboxylic acid functions f2. These chemical modifications may be partial or total and adapted to the application compositions and the optional crosslinking mechanism used. A double functionality may be sought in a dual crosslinking system involving two crosslinking mechanisms, such as, for example, acrylate and epoxy for radical-mediated and cationic crosslinking mechanisms or for radical-mediated and condensation crosslinking mechanisms.

Thus, the initially functionalized microparticles f1 and/or f2, after a suitable chemical modification of the functions f1 and/or f2, can bear, at least partially, functions f3 and/or f4 selected from (meth)acrylates, vinyls, esters or amides containing a $C_{12}$–$C_{22}$ unsaturated fatty chain, maleates and/or maleimides, esters derived from allylic alcohols or cycloaliphatic unsaturations based on dicyclopentadiene or on a tetrahydrophthalic ring system, or carboxylic acid salts by at least partial neutralization of a carboxylic acid.

The molar composition and the functionality of the microgels can be adjusted depending on the desired application. Depending on the nature and proportions of the polymerizable compounds A, B, C and D, the microparticles obtained, with a size ranging from 10 to 300 nm, can, after recovery, be in the form of liquid, wax or solid powder with glass transition temperatures and/or melting points that are variable and adjustable as a function of the needs of the desired application.

Preferably, the composition of the ethylenically unsaturated polymerizable compounds comprises:

5–99 mol % of at least one monomer A comprising only one ethylenic unsaturation which can undergo radical-mediated polymerization, as defined above 0.02–30 mol % and more particularly from 0.5 to 15 mol % of at least one compound B bearing at least two polymerizable ethylenic unsaturations and optionally, depending on the case:

0–80 mol % of at least one compound C which is different from A, comprising only one polymerizable unsaturation 0–80 mol % of at least one compound D which is different from A, B and C, comprising at least one polymerizable ethylenic unsaturation and at least one second reactive function f1 which is different from the ethylenic unsaturation, with the molar percentages of A and B and optionally of C and/or D chosen within the defined limits, such that their sum is equal to 100% relative to the composition of all of the polymerizable compounds present.

More particularly, in the case of microparticles with an initial epoxy function f1 which can be chemically modified, after polymerization, into function f3 containing ethylenic unsaturation, the composition of the polymerizable compounds can comprise:

0–30 mol % of octadecyl (meth)acrylate and/or

5–80 mol % of isobornyl (meth)acrylate as monomer A 0.02–30 mol % of hexanediol di(meth)acrylate as compound B 0–50 mol % of styrene and/or of methyl and/or butyl or tert-butyl (meth)acrylate, as compound C 0–50 mol % of glycidyl (meth)acrylate as compound D, with the molar percentages of A, B, C and D selected such that their sum is equal to 100% of the composition of the polymerizable compounds and with the glycidyl reactive functions possibly being at least partially modified by reaction with an ethylenically unsaturated acid or anhydride. As examples of such ethylenically unsaturated acids, mention may be made of (meth)acrylic acids and maleic acid or anhydride, itaconic anhydride and fumaric acid.

One specific microparticle structure can be obtained if the polymerization is carried out in several successive steps by continuous or batchwise addition, i.e. in a single portion, of the composition of each step which may be identical or different. The composition of each step thus comprises compounds A, B and optionally C and/or D with the same essential respective functions for stabilization, crosslinking, composition adjustment and functionalization as when the polymerization is carried out in a single step. Depending on the composition of each step, the microparticle structures thus obtained can be of multilayer type with a microparticle core whose composition is different from that of the outer layer.

A second subject of the present invention is a process for preparing crosslinked microparticles between 10 and 300 nm in size, comprising a step of dispersion polymerization, in non-aqueous medium which is non-solvent for the polymer to be formed, of a composition of ethylenically unsaturated polymerizable compounds, characterized in that the polymerization step is carried out on a composition comprising:

at least one monomer A, comprising only one ethylenic unsaturation which can undergo radical-mediated polymerization and giving the microparticles formed in the said non-aqueous medium self-stabilization during and after the polymerization, without any addition of polymer having the function of a stabilizing agent, either before, during or after the dispersion polymerization, with the said monomer A preferably being bound to the outer layer and more preferably to the surface of the microparticles thus obtained at least one compound B comprising at least two polymerizable ethylenic unsaturations and optionally, depending on the case:

at least one compound C, comprising only one polymerizable ethylenic unsaturation, which is different from A and/or at least one compound D which is different from A, B and C, comprising at least one polymerizable ethylenic unsaturation and at least one second reactive function f1 which is different from the ethylenic unsaturation.

Preferably, the compound A used for this process is defined by the general formula (I) below:

with $R_1$=H, $CH_3$

X=ester —(C=O)O—, amide —(C=O)N($R_3$)—

Y=ester —O(O=C)—, amide —($R_3$)N(C=O)—, urethane —O(O=C)NH—

$R_2$=$C_2$–$C_6$ alkylene radical which can be substituted with functional groups such as OH $R_3$=$C_1$–$C_6$ alkyl, H k=0 or 1

R=linear or branched $C_8$–$C_{22}$ alkyl or alkenyl radical or $C_8$–$C_{22}$ aralkyl radicals substituted on the aromatic ring, or substituted or unsubstituted $C_6$–$C_{22}$ acyclic, monocyclic or polycyclic radical which can comprise a reactive function f2 selected from: carboxylic acid or anhydride, hydroxyl, epoxy, isocyanate, silane.

The preferred monomers A of formula (I) correspond to R chosen from: isobornyl, norbornyl, lauryl, tridecyl, isodecyl, octadecyl, docosanyl, dicyclopentadienyl, cyclohexyl or a linear or branched alkyl or alkenyl group or a substituted aralkyl group or a $C_8$–$C_{22}$ cycloaliphatic group bearing a carboxylic acid or anhydride, hydroxyl, epoxy and/or isocyanate reactive function f2. As examples of monomers A bearing a carboxylic acid function f2, mention may be made of mono(meth)acrylated derivatives of succinic anhydride substituted with a linear or branched $C_6$–$C_{22}$, preferably $C_6$–$C_{18}$, alkyl or alkenyl, obtained by reacting the alkyl-substituted or alkenyl-substituted anhydride with a hydroxyalkyl (meth)acrylate containing a $C_2$–$C_6$ and preferably $C_2$ or $C_3$ hydroxyalkyl group. As examples of monomers A bearing a hydroxyl function f2, mention may be made of mono(meth)acrylated derivatives of hydroxystearic acid, obtained by reaction of hydroxystearic acid with glycidyl methacrylate or Cardura E10 (meth)acrylate. An epoxy function f2 can be introduced, for example with epoxidized dicyclopentadiene (meth)acrylate, epoxidized vinylnorbornene (meth)acrylate, or an epoxidized unsaturated fatty acid (meth)acrylate. A function f2 can be introduced with a mono(meth)acrylate derived from the reaction between a cycloaliphatic or aliphatic $C_6$–$C_{12}$ diisocyanate with a hydroxyalkyl (meth)acrylate containing a $C_2$–$C_6$ alkyl. In any case, this process does not require the addition of a stabilizing polymer to stabilize the microparticles in dispersion, either before, during or after the polymerization. In general, the self-stabilizing effect is sufficient within a range extending from 5 mol % to 80 mol % as a function of the monomer A chosen. Needless to say, when the monomer A is alone in the presence of the compound B, in this case the molar content can range up to 99 mol %.

The compounds B, C and D of this process which may be monomers and/or oligomers are those already specified for the microparticles obtained. When at least one monomer A bears at least one function f2 and at least one compound D bears at least one function f1, the choice of A and D is made such that there is no reaction between these functions during the polymerization.

The solvent used for this process is an organic solvent or a mixture of organic solvents selected from $C_6$–$C_{10}$ alkanes such as hexanes, heptanes and more particularly n-heptane, cyclohexane, octanes, nonanes and/or $C_3$–$C_5$ alkanols such as isopropanol, butanol or pentanol. Mixtures of apolar solvents such as heptane with polar solvents such as isopropanol are preferred to adjust the solvating power of the medium relative to the polymerizable compounds, on the one hand, and the non-solvating power of the medium, which becomes a precipitation medium relative to the polymer formed, on the other hand. Moreover, this solvent medium should be chemically inert with respect to the reactive functions f1 or f2 or other functions present. The weight ratio between the $C_6$–$C_{10}$ alkane and the $C_3$–$C_5$ alkanol can range from 0/100 to 75/25 and more particularly from 25/75 to 50/50. This remains preferred in particular when this mixture is based on n-heptane or cyclohexane, on the one hand, and on isopropanol or butanol, on the other hand.

The weight ratio between the sum of the compounds A, B, C and D, on the one hand, and the solvent or mixture of solvents, on the other hand, can range from 10/90 to 50/50 and preferably from 15/85 to 30/70. This ratio is one of the parameters of the process for controlling the size of the microparticles. The more the dilution increases, the greater the tendency of the size of the microparticles to decrease.

The dispersion polymerization of the ethylenically unsaturated compounds is carried out via a radical route by adding a radical initiator commonly used for this type of polymerization, which is suited to the medium. The polymerization temperature is adapted to the decomposition temperature of the radical initiator chosen and to the boiling point of the solvent medium used and may vary in general, as a function of the initiator and the solvent medium used, from 20° C. to 150° C. As examples of initiators, mention may be made of: azo derivatives such as azobisisobutyronitrile (AIBN) and derivatives, peroxides and hydroperoxides or any other initiator system which is soluble in the polymerization medium and known to those skilled in the art. More particularly, these initiators can be functionalized with a reactive function f5 such as hydroxyl or carboxyl, such as, for example, hydroxylated or carboxylated azo derivatives. In this case, the microparticles obtained will be at least partially functionalized with the functions f5. Moreover, other radical initiators can be used for a so-called "controlled" or "live" radical-mediated polymerization, as described in Comprehensive Polymer Science, vol.3, pp. 141–146, Pergamon, London, 1989. Similarly, chain-transfer agents such as mercaptans can be combined with the initiator in order better to control the molecular masses. The polymerization time will depend on the nature and content of initiator and on the polymerization temperature. The usual initiator content can range from 0.05 to 5% by weight relative to the sum of the polymerizable compounds A, B, C and D.

According to a first embodiment of this batch process, all of the polymerizable compounds A, B, C and D are added, with stirring, from the start in the reactor containing all of the solvent and maintained at the polymerization temperature. The monomers can also be added in solution form in some of the polymerization solvent. The initiation of the polymerization takes place, with vigorous stirring, by gradual addition of the radical initiator chosen, which is soluble in the polymerization medium. After the end of the addition of the initiator, the polymerization proceeds for a time which can range from 1 h to 8 h depending on the temperature, the nature and content of the initiator, and the nature and overall concentration of polymerizable compounds. The self-stabilized microparticles formed in the polymerization medium can be recovered either after successive steps of precipitation, by adding a non-solvent such as an alcohol in a proportion ranging from 2/1 to 5/1 by weight relative to the dispersion, and then of filtration and drying, or by a single step for evaporating off the dispersion-medium solvent, preferably under a reduced pressure of from 10 to 30 mbar.

The final size of the microparticles obtained ranges from 10 to 300 nm and preferably between 10 and 200 nm and more particularly from 20 to 100 nm as a function of the dilution of the polymerizable compounds and the nature and molar ratio of the monomer A chosen. The size of the microparticles can be reduced by increasing the content of monomer A and/or increasing the molar mass of the monomer A whose chemical structure is of similar formula and/or increasing the level of dilution of the polymerizable compounds and/or increasing the precipitating power of the polymerization medium by adjusting the nature and/or composition of the polymerization-medium solvent. The essential advantage of this process and of its various embodiments is its simplicity and its flexibility in the preparation of a large variety of microparticle structures, by simply varying the nature and proportions of the compounds A, B, C and D.

According to a second embodiment of this process, it comprises one or more successive steps of continuous and/or batchwise polymerization, characterized respectively by an addition of polymerizable compounds continuously or in a single portion per step concerned, respectively. When the process comprises more than one step of batchwise and/or continuous polymerization, the composition of the polymerizable compounds may be identical or different from one step to another. Thus, it is possible to prepare very specific microparticle structures of multilayer type as a function of the composition of the polymerizable compounds in each step and as a function of the chronological order of each continuous or batchwise step.

A continuous embodiment of this process is particularly preferred when the composition of the polymerizable compounds comprises at least one of the compounds A, B, C or D which has reactivity that is significantly different from the average reactivity of the polymerizable compounds. This is particularly preferred when the monomer A has a reactivity that is significantly different from the average reactivity of the other polymerizable compounds. This reactivity may be characterized by the rate of consumption of the polymerizable unsaturations of these compounds. This is the case, for example, if the monomer A is a methacrylate and the other polymerizable compounds are acrylates. A batchwise process may also be envisaged when the monomer A has a reactivity that is significantly different from the average reactivity of the polymerizable compounds if the choice of at least one second monomer A is well adapted such that the reactivities of these two monomers encompass the average reactivity of the other polymerizable compounds.

When the composition of the polymerizable compounds comprises at least one monomer A bearing a function f2 and/or at least one monomer D bearing a function f1, the process as described above can comprise, after the polymerization step, an additional step of chemical modification of the function f2 and/or of the function f1. This chemical modification step can take place, depending on the case, either before recovery of the microparticles by evaporating off the polymerization solvent, or after recovery of these microparticles, in which case the chemical modification can take place, depending on the case, either in bulk if the viscosity allows it at the modification temperature, or in solution in a solvent which is different from the polymerization solvent if the latter is unsuitable, as regards the temperature or the chemical inertness. As a preferred example of a chemical modification, mention may be made of the acrylation of reactive functions such as: epoxy and hydroxyl with acrylic and methacrylic acid or maleic or itaconic acid or anhydride, or carboxylic acid or anhydride with glycidyl methacrylate or hydroxyethyl methacrylate or hydroxyethyl acrylate or oxazoline (meth)acrylate. For example, the acrylation can take place in solution containing about 30–60% of dispersed microparticles, in the presence of esterification catalysts such as chromium(III) diisopropyl salicylate, chromium(III) ethyl hexanoate, ethyltriphenylphosphonium bromide or tertiary amines. When the modified function is a vinyl function, OH functions are modified with a vinyl azlactone such as 2-vinyl-4,4-dimethylazlactone, or a vinyl isocyanate such as m-isopropenyl, dimethyl or benzyl isocyanate.

One variant of this process can comprise, before the polymerization step, a step of dispersion, in the non-aqueous medium, of organic or inorganic microparticles which are insoluble in this medium, followed by a polymerization step as described above. In this case, the organic or inorganic microparticles in dispersion have sizes adapted to that of the final microparticles to be obtained. The predispersed microparticles can be chosen from organic or inorganic pigments or organic or inorganic fillers or additives or previously prepared microparticles as already described which are insoluble in the dispersion medium. This process variant allows an at least partial, but simple and practical coating or encapsulation of the predispersed microparticles, with the aim, for example, of improving their dispersibility in other dispersion media (aqueous or organic media) or of improving their compatibility in recipient matrices for coating, moulding or composite compositions.

A third subject of the invention relates to the use of the microparticles as defined above in coating or moulding compositions, as sole or predominant reactive components or as reactive or unreactive additives. When the microparticles constitute a sole or predominant reactive system in the composition, the content of mutually reactive microparticles constituting the system can range up to 100%. When the microparticles are used as reactive or unreactive additives, the preferred content of microparticles can range from 0.5 to 50% and more particularly from 1 to 30% by weight relative to the organic composition of the coating or moulding.

Among the specific advantages of these microparticles which are recalled are markedly improved compatibility and, depending on the case, reactivity, without any limitation forced by a stabilizing polymer imposed by the fact of its availability.

Moreover, their particular structure obtained by virtue of the specific process used gives them a self-dispersibility and self-stabilizing nature in a solvent medium which is comparable to that of the polymerization. Similarly, this process makes it possible to obtain crosslinked microparticles which are highly monodisperse in terms of size, this being important in order to obtain specific Theological and viscoelastic performance qualities for certain applications in the field of coating compositions, moulding compositions or composites.

In general, these microparticles can be used in crosslinkable or non-crosslinkable coating or moulding compositions in order:

to reduce the viscosity of these compositions, allowing better wetting and better application to the substrates to be coated and, moreover, compositions with a higher solids content and consequently a lower content of volatile organic compounds to better control, by specific application, the rheology of these compositions by adjusting the structure of the microparticles to reinforce or plasticize the matrix as a function of the compatibility and the Tg of the microparticle relative to the host matrix.

The microparticles as unreactive additives can have functions selected from f1, f2, f3 and f4 as defined above which, while being chemically inert with respect to the host composition, can substantially improve the compatibility of the microparticle with respect to the host matrix by means of favourable physicochemical interactions.

In the case of microparticles used as reactive additives, their reactive functions are selected and adapted or modified to react with the reactive functions of the host crosslinkable composition or with each other. For example, in the case of a composition which can undergo radical-mediated, thermal or photochemical crosslinking, containing ethylenically unsaturated monomers and/or monofunctional or multifunctional oligomers, the microparticles, after chemical modification following the polymerization step, will preferably be polyunsaturated. Multi-epoxidized or multihydroxylated reactive microparticles will be adapted for coating compositions of epoxides which can be photocrosslinked cationically in the presence of cationic photoinitiators such as triarylsulphonium or diaryliodonium salts. Multi-epoxidized or multicarboxylated reactive microparticles will be adapted for the crosslinking of coating or moulding compositions based on epoxides and on polyamines or on dicarboxylic acid anhydride or carboxylated acrylic copolymers. Similarly, partially neutralized multicarboxylated microparticles can serve as water-dispersible or water-soluble microparticles depending on the degree of neutralization and can be used in coating compositions based on aqueous dispersions of reactive or unreactive polymers. This water-dispersibility or water-solubility nature can also be imparted by a compound C and/or B selected, respectively, from the mono- and diacrylates or methacrylates of polyether diols such as polyethylene glycol with an $\overline{Mn}$ of less than 1500. In particular, microparticles thus water-dispersible or water-soluble bearing acrylate or methacrylate functions after partial modification of their initial functions f1 or f2 can be used in photocrosslinkable coatings based on aqueous dispersions of polymers, preferably acrylic polymers. When microparticles are used as reactive additives on account of their high functionality, they have a function as a genuine crosslinking agent and reactivity activator for the system concerned. The effect on the mechanical performance qualities of the coating or of the moulded product is reflected either by an increased reinforcement of the matrix or by a combined effect of increased reinforcement and flexibility, as a function of the functionality, compatibility and Tg of the microparticle chemically grafted to the host matrix, the microparticle behaving like a grafted or ungrafted and hard or flexible microfiller.

Moreover, depending on the nature of the reactive functions, in particular in the case of unsaturations which can undergo radical-mediated crosslinking, these microparticles can be used alone or as a predominant component of a crosslinkable matrix. This also remains valid for other microparticles bearing functions f1 and/or f2 and/or f3 and/or f4 which are different from each other but mutually reactive, thus possibly producing a reactive two-component system, this system merely being the sole or predominant component of the composition. This is particularly advantageous in the case of microparticles which can be used as crosslinkable powders for coating or moulding systems.

The coating or moulding compositions concerned can find applications in very varied fields, such as protective varnishes, paints, adhesives, inks, composites and matrices for composites, powders for moulding or for coatings, or moulded products. In this respect, common additives and/or fillers may be present depending on the intended application.

The examples which follow can illustrate the present invention without any limitation on the choice of the parameters described.

EXAMPLE 1

Synthesis of Crosslinked Microparticles (CPMs)

94 g of n-heptane and 93.5 g of 2-propanol are introduced into a 500 ml reactor equipped with a condenser and a mechanical stirrer, and under a gentle flow of nitrogen. The temperature is raised to 70° C. A mixture of (meth)acrylic monomers whose composition is given below was then loaded into the reactor:

| | | |
|---|---|---|
| octadecyl acrylate (ODA): | 31.0 g | i.e. 30 mol % (relative to the monomers) |
| butyl acrylate (BA): | 20.2 g | i.e. 48 mol % |
| methyl methacrylate (MMA): | 3.3 g | i.e. 10 mol % |
| glycidyl methacrylate (GMA): | 3.0 g | i.e. 6 mol % |
| hexanediol diacrylate (HDDA): | 4.8 g | i.e. 6 mol % |

The composition per compound A, B, C or D is as follows:

Monomer A=30 mol % of ODA

Monomer B=6 mol % of HDDA

Monomer C=48 mol % of BA and 10 mol % of MMA

Monomer D=6 mol % of GMA

The temperature is stabilized at 70° C. and 0.52 g of azobisisobutyronitrile (AIBN) is introduced into the reactor, i.e. 10 mmol/l. The reaction takes place at isothermal temperature (70° C.) for 5 h, without noting any significant exothermicity. The dispersion remains transparent and homogeneous, of low viscosity, throughout the duration of the synthesis. At the end of the 5 h of reaction, the conversion of the monomers is greater than 95% according to the monitoring of the monomers by steric exclusion chromatography (SEC) and by measuring the solids content in the solution. The CPMs formed are isolated by distilling off the synthesis solvents. The condenser is replaced with a distillation column and the temperature of the dispersion is gradually raised to 105° C. The CPMs are then dried under vacuum (20 mbar) to remove all trace of residual solvent. Once dried, the CPMs have the appearance of a wax, which is sticky at room temperature. The size and molar mass of the CPMs are determined by a technique of multi-angle laser light scattering (ref. DAWN WYATT Technology at $\lambda=632$ nm) on exiting the steric exclusion chromatography columns (SEC-MALLS). This technique gives access to the true average molar mass, $\overline{Mw}$, as well as to an average radius of gyration $R_z$ of the particles swollen by the mobile phase (solvent=tetrahydrofuran). The values thus determined are $\overline{Mw}=3\times10^6$ g/mol and $\overline{Rz}=54$ nm.

The CPMs synthesized bear epoxy functions at a measured content of $3.5\times10^{-4}$ mol/g.

EXAMPLE 2

The CPMs synthesized in Example 1 are modified by acrylation. The epoxide groups of the CPMs are chemically modified by reaction with acrylic acid (AA) at 100° C. in the presence of a reaction catalyst, 0.8% by weight of chromium (III) diisopropyl salicylate (CrDIPS) and 0.3% by weight of hydroquinone to avoid any radical-mediated polymerization of the acrylic functions. By virtue of the low viscosity of the CPMs in bulk at 100%, chemical modification takes place without solvent, in a 250 ml stirred reactor equipped with a condenser and under a gentle flow of nitrogen. The acrylic acid is introduced in slight excess, such that the [acid]/[epoxy]=1.05. At the end of the chemical modification, the CPMs obtained have a concentration of reactive acrylic double bonds [C=C]=$3.2\times10^{-4}$ mol/g. This corresponds to a degree of acrylation of 90%, measured by standard chemical assay of the residual epoxy functions. The appearance at room temperature is identical to that of Example 1.

EXAMPLE 3

Comparative

The invention is compared with the known prior art by replacing, in this case, the ODA of Example 1 with a stabilizing polymer, according to the method of the prior art, based on ODA. The final composition of the CPMs is, overall, that of Example 1 (12.5% by weight of polymeric stabilizer or of monomeric stabilizer/total).

Synthesis of the Polymeric Stabilizer

A copolymer of ODA and of GMA with a 90/10 molar ratio is synthesized by radical-mediated solution polymerization in toluene. This copolymer was then acrylated according to the method described in Example 2. The molar mass $\overline{Mw}$ of the stabilizing copolymer, determined by steric exclusion chromatography, is 8700 g/mol. The average functionality of the copolymer is about 2.2 C=C/chain. The final product is a solid which is highly crystalline at room temperature.

Synthesis of CPM with the Polymeric Stabilizer Described Above

The synthesis takes place under the same conditions as in Example 1. The composition is given below:

| | |
|---|---|
| n-heptane: | 94.5 g |
| 2-propanol: | 94 g |
| stabilizing polymer described above: | 31.1 g |
| BA: | 22 g |
| MMA: | 3.4 g |
| GMA: | 3.3 g |
| HDDA: | 2.6 g |
| AIBN: | 0.52 g |

The final overall molar composition of the CPMs is thus:

ODA/BA/MMA/GMA/HDDA=27/50/10/9/4 mol %

This corresponds approximately to the same molar composition of the CPMs synthesized with the stabilizer ODA alone, described in Example 1.

The dispersion remains of low viscosity throughout the duration of the synthesis. The size and mass of the CPMs is determined by SEC-MALLS: $\overline{Mw}=3\times10^5$ g/mol and $\overline{Rz}=39$ nm. The CPMs are in the form of a solid which is crystalline at room temperature.

Chemical Modification by Acrylation of the CPMs Described Above

The chemical modification by acrylation took place in the same way as that described in Example 2. After chemical modification, the CPMs obtained had a concentration of reactive acrylic double bonds [C═C]=3.5×10$^{-4}$ mol/g. The appearance at room temperature remains identical to that obtained above.

EXAMPLE 4

Comparative Characterization

The CPMs of Example 1 and Example 2 with the stabilizing monomer ODA, on the one hand, and those of Example 3 with the stabilizing polymer based on ODA, on the other hand, are compared here in terms of physical and chemical characteristics:

Differential Calorimetric Analysis: Melting Point and Glass Transition Temperature The CPMs are characterized by differential calorimetric analysis (METTLER DSC). Samples of about 15 mg are placed in aluminium crucibles. The rate of temperature increase is 10° C./min over a temperature range from −100 to +200° C. The scans are carried out under a flow of argon. The CPMs of Examples 1 and 3 show a glass transition onset temperature, $T_g^{onset}$=−20° C. The glass transition is much less pronounced for the CPMs synthesized with the stabilizing polymer. They are both semi-crystalline. The CPMs synthesized with the stabilizing monomer ODA have a melting peak $T_m$=27° C., for an amplitude $\Delta H_m$=21 J/g. The CPMs synthesized with the stabilizing polymer based on ODA have a melting peak $T_m$=44° C., for an amplitude $\Delta H_m$=44 J/g. The CPMs synthesized with the stabilizing polymer based on ODA are thus much more crystalline than those synthesized with the stabilizing monomer ODA, for the same overall composition, on account of the high local concentration of ODA units.

Photopolymerization of a CPM+Acrylate Monomer Mixture

To compare the reactivities of the CPMs, differential photocalorimetry tests are carried out.

The acrylated CPMs of Examples 2 and 3, respectively, are mixed to a proportion of 10% by mass with isobornyl acrylate IBOA. 1% by mass of photoinitiator, 2,2-dimethoxy-2-phenylacetophenone, is also added. The mixtures are prepared at room temperature. The solution containing the CPMs synthesized with the stabilizing polymers based on ODA is solid up to about 15° C. It is opalescent up to about 30° C. and becomes transparent and of low viscosity at higher temperatures. The solution with the CPMs synthesized with the stabilizing monomer ODA remains liquid and of low viscosity at least for a temperature ≧4° C. and is always transparent. These differences arise from the very high crystallinity of the CPMs synthesized with the stabilizing polymer based on ODA.

About 5 mg of each solution described above are placed in aluminium crucibles for these differential photocalorimetry tests. The crucibles are placed in a PERKIN ELMER DSC 7 photocalorimeter under a flow of nitrogen under isothermal conditions at 50° C. for 2 min before the start of the UV irradiation to ensure the temperature stabilization of the samples, purging of the photocalorimeter and complete fusion of the crystalline parts. The UV irradiation (λ=350 nm) takes place at 50° C. for 20 min to reach the maximum conversion. FIG. 1 attached gives a comparison of the results for the two types of CPM compared. The irradiation time t=0 s corresponds to the start of the UV irradiation.

This figure demonstrates that the CPMs synthesized according to the invention are much more reactive than those obtained according to the standard method of the prior art based on ODA. This difference in reactivity demonstrates that the reactive functions are affected by the presence of the stabilizing polymer, which acts as a barrier limiting the access to these functions.

EXAMPLES 5–9: SEE TABLE BELOW

| EX. | NATURE/ COMPOSITION OF THE CPMs | SYNTHETIC METHOD/ COMMENTS | CHARACTERISTICS OF THE CPMS | OBSERVATIONS |
|---|---|---|---|---|
| No. 5 | Monomer A = 52 mol % of IBOA + 30 mol % of ODA (octadecyl acrylate) Monomer B = 5 mol % of HDDA Monomer D = 13 mol % of GMA | Example 1 Low viscosity and transparency of the non-aqueous dispersion | $\overline{Mw}$ = 1.1 × 10$^5$ g/mol $\overline{Rz}$ = 21 nm 95% of the CPMs between 10 and 25 nm epoxidized CPMs | Appearance: wax at room temperature Semi-crystalline CPMs Melting point Tm = 15° C. Glass transition T$^{onset}$ = 61° C. |
| No. 6 | Acrylation of CPM of Example 5 | Example 2 | [C═C] = 3.7 × 10$^{-4}$ mol/g acrylated CPMs | Final conversion of the epoxide groups = 67% |
| No. 7 | Monomer A = 52 mol % of IBOA + 30 mol % of lauryl | Example 5 By replacing ODA with lauryl acrylate | $\overline{Mw}$ = 3.8 × 10$^5$ g/mol $\overline{Rz}$ = 27 nm epoxidized CPMs | Viscous liquid at room temperature Amorphous |

-continued

| EX. | NATURE/ COMPOSITION OF THE CPMs | SYNTHETIC METHOD/ COMMENTS | CHARACTERISTICS OF THE CPMS | OBSERVATIONS |
|---|---|---|---|---|
| | acrylate Monomer B = 5 mol % of HDDA Monomer D = 13 mol % of GMA | ($C_{12}$) | | CPM: 2 glass transitions $Tg^{onset} = 22°$ C. and $Tg^{onset} = 62°$ C. |
| No. 8 | Monomer A = 52 mol % of IBOA + 30 mol % of docosanol acrylate Monomer B = 5 mol % of HDDA Monomer D = 13 mol % of GMA | Example 5 By replacing ODA with docosanol acrylate (22) Low viscosity and transparency of the dispersion | $\overline{Mw} = 3.5 \times 10^4$ g/mol $\overline{Rz} = 19$ nm epoxidized CPMs | Appearance: solid at room temperature Semi-crystalline CPM: $T_{melting} = 36°$ C. and $Tg^{onset} = 66°$ C. |
| No. 9 | Monomer A = 76 mol % of IBOA Monomer B = 5 mol % of HDDA Monomer D = 19 mol % of GMA | Example 5 Low viscosity and transparency of the dispersion | $\overline{Mw} = 5.8 \times 10^5$ g/mol $\overline{Rz} = 31$ nm epoxidized CPMs | Appearance: solid at room temperature Amorphous CPM: $Tg^{onset} = 62°$ C. |

EXAMPLE 10

The CPMs described in Example 9 are acrylated by reaction with acrylic acid (AA), at 100° C., in the presence of a reaction catalyst, 0.8% by mass of chromium(III) diisopropyl salicylate (CrDIPS), and 0.3% by mass of hydroquinone. On account of the high viscosity of these CPMs in bulk at 100° C., the chemical modification proceeds to 50% in solution in toluene, in a 250 ml reactor equipped with a condenser and a mechanical stirrer, and under a gentle flow of nitrogen. The acrylic acid is introduced in slight excess relative to the epoxide groups, such that the [acid]/[epoxy]= 1.05. At the end of the chemical modification, the CPMs are dried under vacuum at 20 mbar at room temperature. The final conversion of the epoxide groups is 95%, which corresponds to a concentration of reactive acrylic double bonds [C=C]=9.1×10$^{-4}$ mol/g. The appearance is identical to that of the CPMs described in Example 9. A fine powder of CPM is finally obtained at room temperature.

EXAMPLE 11

A stabilizing monomer A, comprising an ethylenic unsaturation and a second reactive function f2 which is different from the ethylenic unsaturation, was synthesized. The use of this stabilizing monomer allows the synthesis of CPMs bearing reactive groups f2 preferably at the surface.

Synthesis of the Doubly Functionalized Stabilizing Monomer: f2: —$CO_2H$

The doubly functionalized stabilizing monomer is based on the condensation of an alkenylsuccinic anhydride with hydroxyethyl acrylate (HEA) according to the following scheme:

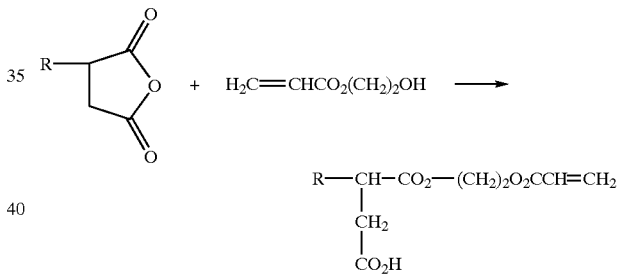

The radical R— is an equimolar mixture of —$CH_2CH=CH(CH_2)_{12}CH_3$ and of —$CH_2CH=CH(CH_2)_{14}CH_3$ corresponding to an equimolar mixture of n-hexadecenylsuccinic anhydride and of n-octadecenylsuccinic anhydride, supplied by Pentagon under the name Pentasize 68. The condensation took place in bulk at 60° C., under a gentle flow of nitrogen. Under these conditions, the carboxyl group formed does not react. After reaction for 9 h, the degree of esterification is 80%. The product synthesized, named AASA68, has a theoretical molar mass of 452 g/mol. AASA68 is a liquid which is transparent at room temperature.

Synthesis of CPMs with the Stabilizing Monomer AASA68

The synthesis proceeds according to the process described in Example 1. The monomer composition is:

Monomer A: 30 mol % of AASA68+65 mol % of IBOA
Monomer B: 5 mol % of HDDA

The dispersion is of low viscosity throughout the synthesis and remains transparent. The size and molar mass are:

$\overline{Mw}=1.8\times10^5$ g/mol and $\overline{Rz}=20$ nm

EXAMPLES 12–23: SEE TABLE BELOW

| EX. | NATURE/ COMPOSITION OF THE CPMs | SYNTHETIC METHOD/ COMMENTS | CHARACTERISTICS OF THE CPMs | OBSERVATIONS |
|---|---|---|---|---|
| No. 12 | Monomer A = 30 mol % of ODA<br>Monomer B = 5 mol % of HDDA<br>Monomer C = 65 mol % of BA | Example 1 Dispersion of low viscosity and transparent | Non-functionalized CPMs | Sticky wax at room temperature. |
| No. 13 | Monomer A = 30 mol % of ODA<br>Monomer B = 5 mol % of HDDA<br>Monomer D = 65 mol % of AA | Example 1 Dispersion of low viscosity and transparent | $\overline{Mw}$ = $9.0 \times 10^5$ g/mol<br>$\overline{Rz}$ = 30 nm<br>Carboxylated CPMs | Appearance: solid at room temperature, grindable into a fine powder<br>Water-soluble CPM after neutralization of the carboxyl groups |
| No. 14 | Methacrylation of the CPMs of Example 13 | Example 10 but with [acid]/[epoxy] = 6.7 | Degree of final methacrylation = 15%<br>● [C=C] = $6.4 \times 10^{-4}$ mol/g<br>● [COOH] = $3.5 \times 10^{-3}$ mol/g | Appearance: solid at room temperature, grindable into a fine powder |
| No. 15 | Monomer A = 76 mol % of IBOA<br>Monomer B = 5 mol % of HDDA<br>Monomer D = 19 mol % of HEMA | Example 9 By replacing GMA with HEMA | $\overline{Mw}$ = $7.5 \times 10^5$ g/mol<br>Rz = 32 nm<br>Hydroxylated CPMs | Appearance: solid at room temperature, grindable into a fine powder |
| No. 16 | Monomer A = 30 mol % of ODA + 55 mol % of IBOA<br>Monomer B = 5 mol % of HDDA<br>Monomer D = 10 mol % of itaconic anhydride | Example 5 With n-heptane as solvent Dispersion of low viscosity and transparent | CPM bearing anhydride functions | |
| No. 17 a) | Monomer A = 30 mol % of ODA + 54 mol % of IBOA<br>Monomer B = 2.5 mol % of HDDA<br>Monomer D = 13.5 mol % of GMA | Example 1 Variation of B (2.5%) Dispersion of low viscosity and transparent | $\overline{Mw}$ = $2.4 \times 10^4$ g/mol<br>$\overline{Rz}$ = 22 nm<br>Epoxidized CPMs | |
| No. 17 b) | Monomer A = 30 mol % of ODA + 48 mol % of IBOA<br>Monomer B = 10 mol % of HDDA<br>Monomer D = 12 mol % of GMA | Example 1 Variation of B (10%) Identical to 17a) but slight increase in viscosity | $\overline{Mw}$ = $4.2 \times 10^4$ g/mol<br>$\overline{Rz}$ = 54 nm<br>Epoxidized CPMs | |

-continued

| EX. | NATURE/ COMPOSITION OF THE CPMs | SYNTHETIC METHOD/ COMMENTS | CHARACTERISTICS OF THE CPMs | OBSERVATIONS |
|---|---|---|---|---|
| No. 18 | Monomer A = 30 mol % of ODA<br>Monomer B = 5 mol % of HDDA<br>Monomer C = 52 mol % of BA<br>Monomer D = 13 mol % of GMA | Example 1<br>Dispersion of low viscosity and transparent | $\overline{Mw}$ = 1.3 × 10$^5$ g/mol<br>$\overline{Rz}$ = 22 nm<br>Epoxidized CPMs | Sticky wax at room temperature<br>Semi-crystalline CPM<br>$T_{melting}$ = 27° C.<br>and<br>$Tg^{onset}$ = −27° C. |
| No. 19 | Acrylation of the CPMs of Example 18 | Example 2 | Degree of acrylation = 35%<br>● [C═C] = 2.4 × 10$^{-4}$ mol/g<br>[epoxy] = 4.5 × 10$^{-4}$ mol/g<br>Acrylated CPMs | CPM of double function-ality: epoxy + acrylate |
| No. 20 | a) Identical to Example 9 | Example 5<br>With concentration of polymeriz-able compounds = 15% by weight | $\overline{Mw}$ = 4.0 × 10$^4$ g/mol<br>$\overline{Rz}$ = 13 nm<br>Epoxidized CPMs | Dispersion of low viscosity and transparent |
|  | b) Identical to Example 9 | Example 5<br>With concentra-tion of polymeriz-able compounds = 30% | Epoxidized CPMs | Transparent dispersion with slight increase in viscosity |
| No. 21 | a) Identical to Example 5 | Example 5 with solvent: n-heptane | $\overline{Mw}$ = 3.5 × 10$^6$ g/mol<br>$\overline{Rz}$ = 56 nm<br>Epoxidized CPMs | Viscosity increases during the synthesis, and opalescent dispersion |
|  | b) Identical to Example 5 | Example 5 with solvent: 2-propanol | $\overline{Mw}$ = 1.3 × 10$^5$ g/mol<br>$\overline{Rz}$ = 33 nm<br>Epoxidized CPMs | Opalescent dispersion with low viscosity |
|  | c) Identical to Example 5 | Example 5 with solvent: n-heptane/ 2-propanol mixture 25/75 by mass | $\overline{Mw}$ = 8.6 × 10$^4$ g/mol<br>$\overline{Rz}$ = 25 nm<br>Epoxidized CPMs | Transparent dispersion low viscosity |
| No. 22 | Monomer A = 20 mol % of ODA and 20 mol % of octadecyl methacrylate<br>Monomer B = 5 mol % of HDDA<br>Monomer C = 40 mol % of methyl methacrylate<br>Monomer D = 15 mol % of GMA | Example 1 | $\overline{Mw}$ = 8.6 × 10$^6$ g/mol<br>$\overline{Rz}$ = 50 nm<br>Epoxidized CPMs |  |
| No. 23 | A: Cardura E10 acrylate: 20 mol % | Example 1 | $\overline{Mw}$ = 260,000<br>$\overline{Rz}$ = 29 nm<br>Hydroxylated |  |

-continued

| EX. | NATURE/ COMPOSITION OF THE CPMs | SYNTHETIC METHOD/ COMMENTS | CHARACTERISTICS OF THE CPMs | OBSERVATIONS |
|---|---|---|---|---|
| | B: HDDA: 5 mol % C: butyl acrylate: 55 mol % D: 2-(2-hydroxyethyl) acrylate: 20 mol % | | CPMs | |

EXAMPLE 24

Continuous Process

The CPM microparticles are synthesized in a mixture of n-heptane and 2-propanol (at 50/50 by mass), with a monomer concentration of 25% by weight. The stabilization is provided by octadecyl acrylate (ODA). The (meth)acrylic monomers are introduced continuously to reduce the composition derivatives, during the synthesis, of the CPMs formed.

A mixture of solvents (I), 56.5 g of n-heptane and 56 g of 2-propanol, is introduced into a stirred 500 ml reactor equipped with a condenser and under a gentle flow of nitrogen. The temperature is raised to 70° C. and stabilized at ±1° C.

A mixture (II) of solvents, (meth)acrylic monomers and initiator, presented below, is prepared in a 500 ml round-bottomed flask at room temperature and under a gentle flow of nitrogen:

n-heptane=56.0 g
2-propanol=56.5 g
Monomers A=ODA=39.8 g (30 mol %/total monomers)
Monomer B=HDDA=4.7 g (5 mol %)
Monomer C=MMA=18.4 g (45 mol %)
Monomer D=GMA=11.6 g (20 mol %)
Initiator: AIBN=0.66 g (10 mmol/L/total monomers)

The mixture (II) is introduced continuously, using a pump, into the reactor containing the mixture (I) at 70° C. The introduction time of (II) lasts for 3 h. The reaction takes place at 70° C. without any significant exothermicity. At the end of the introduction of the mixture (II), a post-reaction takes place at 70° C. for 4 h. The dispersion remains transparent, homogeneous and of low viscosity throughout the duration of the synthesis. The CPMs formed are isolated by distilling off the synthesis solvents as described in Example 1. The CPMs obtained are solid at room temperature and can be ground to a fine powder. The characterization techniques described in Example 1 are used to determine: $\overline{Mw}$=1.3×10$^6$ g/mol and $\overline{Rz}$=41 nm. The CPMs obtained bear epoxide functions with an epoxy content of 1.1×10$^{-3}$ mol/g.

EXAMPLE 25

The process of Example 24 is used for CPMs of the following composition:

Monomers A: 25 mol % of ODA+35 mol % of IBOA
Monomer B: 5 mol % of polyethylene glycol dimethacrylate (M=600)
Monomer C: 20 mol % of polyethylene glycol monomethyl acrylate methyl ether (M=1000)
Monomer D: 15 mol % of GMA The dispersion remains transparent and of low viscosity throughout the synthesis. Characteristics measured:

$\overline{Mw}$=2.3×10$^6$ g/mol and $\overline{Rz}$=39 nm

These CPMs have the particular feature of being water-dispersible.

EXAMPLE 26

The CPMs described in Example 25 are acrylated according to Example 2. The degree of acrylation of the epoxide groups is 95%, which corresponds to a content of reactive acrylic double bonds [CαC]=3.6×10$^{-4}$ mol/g.

EXAMPLE 27

Process in Two Successive Steps: Batchwise+ Continuous

The CPMs are synthesized in a mixture of n-heptane and 2-propanol. The (meth)acrylic monomers are introduced stepwise in order to obtain CPMs of controlled structure.

A mixture (I), as described below, of solvents, acrylic monomers and radical initiator is introduced into a stirred 500 ml reactor equipped with a condenser and under a gentle flow of nitrogen. The temperature is raised to 70° C. and stabilized to ±1° C.

n-heptane=84.5 g
2-propanol=84.5 g
Monomers A=ODA=28.9 g (30 mol %/total monomers of (I))
Monomer B=HDDA=0.83 g (1 mol %/total monomers of (I))
Monomer C=BA=26.2 g (69 mol %/total monomers of (I))
Initiator: AIBN=0.66 g (10 mmol/L on total of the monomers)

The reaction takes place for 2 h at 70° C. without any significant exothermicity. The dispersion remains transparent and homogeneous, of low viscosity throughout this period. At the end of the 2 h of reaction, a mixture (II) of solvents and of (meth)acrylic monomers, of composition given below, is introduced into a 500 ml round-bottomed flask at room temperature and under a gentle flow of nitrogen, followed by continuous introduction into the reactor containing the mixture (I):

n-heptane=28.2 g
2-propanol=28.2 g
Monomers A=IBOA=15.6 g (80 mol %/total monomers (II))

Monomer B=HDDA=1.1 g (5 mol %/total monomers (II))

Monomer D=GMA=2.0 g (15 mol %/total monomers (II))

The introduction of (II) lasts for 3 h, at 70° C., without any significant exothermicity. At the end of the introduction of the mixture (II), a post-reaction at 70° C. takes place for 2 h. The dispersion remains transparent, homogeneous and of low viscosity throughout the duration of the synthesis. The CPMs obtained are isolated and characterized according to the method and techniques described in Example 1. Characteristics measured:

$\overline{Mw}=1.6\times10^4$ g/mol and $\overline{Rz}=18$ nm

By virtue of the epoxide groups introduced by GMA, the CPMs synthesized bear reactive epoxide functions, preferably at the surface.

EXAMPLE 28

Coating Application

CPMs described above are used in crosslinkable coatings. Crosslinking by Radical-mediated Photopolymerization A formulation is prepared at room temperature by mixing together:

2.85 g of CPMs described in Example 10

4.66 g of IBOA 1.99 g of ethoxyethoxyethyl acrylate (EEEA)

0.20 g of Irgacure 184

0.30 g of Darocur 1173

The mixture obtained is transparent, homogeneous and of low viscosity. Using this mixture, a film 125 µm thick is deposited on a glass plate. This film is photopolymerized by 8 successive passages at 5 m/min under a high power UV lamp (FUSION lamp type H, 120 W/cm). After crosslinking, the film is transparent and hard. It has an excellent hardness/flexibility compromise.

A traction test carried out on these films at 21° C. at a deformation rate of 1 mm/min gives a deformation at break of 65% and a breaking stress of 12 MPa and a Young's modulus E=130 MPa.

EXAMPLE 29

Coating Application
Crosslinking by Cationic Photopolymerization

A formulation is prepared at 50° C., containing:

0.97 g of CPMs described in Example 15

8.73 g of cycloaliphatic epoxy compound SARCAT K126

0.30 g of photoinitiator SARCAT KI85

The solution obtained is transparent, homogeneous and of low viscosity at 50° C. A film of this solution 125 µm thick is deposited on a glass plate. This film is photopolymerized by 10 successive passages at 3 m/min under a high power UV lamp (FUSION lamp type H, 120 W/cm). A post-reaction takes place in an oven at 105° C. for 2 h. After crosslinking, the film is transparent and hard. It has good flexibility and a good appearance.

EXAMPLE 30

Coating Application
Crosslinking by Radical-mediated Thermal Polymerization

A formulation containing:

1.98 g of CPMs described in Example 6

7.92 g of IBOA 0.10 g of AIBN is prepared at room temperature. The solution obtained is transparent, homogeneous and of low viscosity. A film of this solution 125 µm thick is deposited on a glass plate. This film is heat-polymerized at 80° C. for 2 h. After crosslinking, the film is transparent and hard. The free film has good flexibility.

EXAMPLE 31

Coating Application

Crosslinking by Radical-mediated Thermal Polymerization of a Hydrodispersed CPM

A formulation is prepared at room temperature containing:

2.00 g of CPMs described in Example 26

8.00 g of water

After mixing, the solution obtained is milky, stable and of fairly low viscosity. A film of this solution 100 µm thick is deposited on a glass plate. The water is evaporated off at 70° C. for 1 h and the film is then heat-polymerized at 140° C. for 4 h. After crosslinking, the free film is transparent, hard and fairly flexible.

EXAMPLE 32

Coating Application

Thermal Polymerization by Polycondensation Between Hydroxyl Function and Blocked Isocyanate Function A mixture containing:

6.0 g of CPMs described in Example 15

2.0 g of HDI trimer blocked with a phenol is prepared by finely grinding together the two products at room temperature. Differential calorimetric analysis of this mixture is carried out by placing a 15 mg sample in an aluminium crucible. The rate of temperature increase is 10° C./min. Exothermicity is observed at and above 120° C., with a maximum recorded at 170° C. This corresponds to the OH/blocked NCO reaction. At the end of the reaction, a hard solid with a Tg=52° C. is obtained.

EXAMPLE 33

Coating Application

Thermal Polymerization by Polycondensation Between Epoxide Function and Carboxyl Function A mixture containing:

3.0 g of CPMs described in Example 9

7.0 g of carboxyl-functionalized saturated polyester containing a catalyst for the epoxy/acid reaction (REAFREE 6803 sold by Cray Valley Ibérica)

is prepared by finely grinding together the two products at room temperature. This mixture is placed as a thin layer in an aluminium crucible, which is placed in an oven. The temperature is gradually raised to 160° C., with isothermal maintenance for 2 h. After returning to room temperature, a film about 1 mm thick which is hard, transparent and homogeneous is obtained.

EXAMPLE 34

Coating Application
Thermal Polymerization by Polycondensation Between Carboxyl Function and Epoxide Function A mixture containing:

3.0 g of CPMs described in Example 13

7.0 g of bisphenol A diglycidyl ether (DGEBA, DER 662, epoxy equivalent weight=650)

0.2 g of catalyst for the epoxy/acid reaction CrDIPS is prepared by finely grinding together the products at room temperature. The mixture is placed as a thin layer in an aluminium crucible and subjected to the reaction conditions described in Example 33, with maintenance under isothermal conditions for 2 h. After returning to room temperature, a film about 1 mm thick which is hard, transparent and homogeneous is obtained.

EXAMPLE 35

Coating Application
Thermal Polymerization by Radical-mediated Polymerization

A mixture containing:

3.0 g of CPMs described in Example 14

7.0 g of acrylate-functionalized saturated polyester (REAFREE ND-1530 sold by Cray Valley Ibérica)

is prepared by finely grinding together the two products at room temperature. Under the same reaction conditions as in Examples 33 and 34, a film about 1 nm thick which is hard, transparent and homogeneous is obtained.

EXAMPLE 36

Moulding Applications

Some of the CPMs described above are incorporated into "moulding" compositions.
Thermal Polymerization by Polycondensation Between Epoxide Function and Amine Function 17.0 g of CPMs described in Example 18 and 68.1 g of bisphenol A diglycidyl ether (DGEBA, n=0.15) were mixed together at 135° C. The solution obtained is homogeneous and of very low viscosity. 35.0 g of 4,4'-methylenebis(3-chloro-2,6-diethyl-aniline) (MCDEA) are mixed together for 3 min and the mixture is then poured into a Teflon-lined metal mould and placed in an oven. Curing is carried out first at 135° C. for 14 h and then at 190° C. for 4 h. After returning to room temperature, the plaque obtained is opaque but has a homogeneous distribution of the CPMs, and has a tenacity, measured by the parameter $K_{1c}$, which is increased by 33% ($K_{1c}$ without microparticles: 0.6 MPa·m$^{1/2}$, and with microparticles: 0.8 MPa·ml$^{1/2}$).

EXAMPLE 37

Moulding application

Another formulation is prepared by mixing together 17.0 g of CPMs described in Example 19 and 71.0 g of bisphenol A diglycidyl ether (DGEBA, n=0.15). A homogeneous solution of very low viscosity is thus obtained. 36.0 g of MCDEA are then mixed together for 3 min, after which the mixture is poured into a Teflon-lined metal mould and placed in an oven. Curing is carried out as in Example 36. The plaque obtained is opaque but has a homogeneous distribution of the CPMs and has a tenacity, measured by the parameter $K_{1c}$, which is increased by 50% ($K_{1c}$ without microparticles:

0.6 MPa·m$^{1/2}$, and with microparticles: 0.9 MPa·m$^{1/2}$) while conserving a constant mechanical transition temperature $T_\alpha$ of 183° C.

EXAMPLE 38

Moulding Application

Another formulation is prepared by mixing together 10.8 g of CPMs described in Example 14 and 42.9 g of bisphenol A diglycidyl ether (DGEBA, n=0.15) at 135° C. The solution obtained is homogeneous and of low viscosity. 21.3 g of MCDEA are mixed together for 3 min, after which the mixture is moulded and cured as described in Examples 36 and 37. The plaque obtained is transparent and homogeneous and has a tenacity, measured by the parameter $K_{1c}$, which is increased by 100% ($K_{1c}$ without microparticles:

0.6 MPa·m$^{1/2}$, and with microparticles: 1.2 MPa·m$^{1/2}$).

EXAMPLE 39

Rheological Effect

Noteworthy rheological behaviour is observed for solutions containing the CPMs described above.
Decrease in Viscosity Relative to Linear Polymers Measurements of intrinsic viscosity are taken at 30° C. with a capillary rheometer on mixtures of unreactive solvent, such as, for example, toluene, and of CPMs synthesized according to the process described in Example 5, and of composition:

Monomers A: 30 mol % of ODA+52 mol % of IBOA

Monomer B: 5 mol % of HDDA

Monomer D: 13 mol % of GMA and with a molar mass ranging from $2\times10^4$ to $5\times10^6$ g/mol. The Mark-Houwink coefficient "a" linking the intrinsic viscosity to the molar mass of the polymers by the relationship $[\eta]=k\overline{Mw}^a$ was determined: a=0.21. This value was compared with that obtained with a linear polyacrylate of formula BA/GMA/MMA=75/11/14 mol %, with a molar mass ranging from $1.2\times10^4$ to $6.5\times10^4$ g/mol, under the same conditions as those described above. The value of the Mark-Houwink parameter is: a=0.9. This thus confirms the much lower viscosity of CPMs compared with linear polymers for an identical molar mass, by virtue of their very compact structure.

Equivalent behaviour is observed in most reactive solvents, such as styrene and (meth)acrylic monomers.

EXAMPLE 40

Shear-thinning and Thixotropic Effect of CPM Solutions

Viscosity measurements are carried out at 40° C. with a rheometer of cone/plate type in static regime with a Rheometrics Dynamic Analyser RDA II machine. The shear rate ranges from 0.1 to 5000 s$^{-1}$. The CPMs described in Example 9 are mixed with an unreactive solvent, such as, for example, xylene, in proportions by mass ranging from 10 to 80%. The solutions are of low viscosity even for high concentrations of CPM. For CPM concentrations of greater than 30% by weight, the solutions become shear-thinning. For a mixture containing 40% by weight of CPM, for example, the viscosity measured at 0.2 s$^{-1}$ is 500 times greater than that measured at 1000 s$^{-1}$. Furthermore, these systems are thixotropic and show hysteresis between the rise and the fall in shear rate. This hysteresis is proportionately greater the higher the concentration of CPM.

Equivalent behaviour is observed in most reactive solvents, such as styrene and (meth)acrylic monomers.

What is claimed is:

1. Crosslinked microparticles between 10 and 300 nm in size, obtained by dispersion polymerization, in a non-aqueous medium which is a non-solvent for the polymer formed, starting with a composition of ethylenically unsaturated polymerization compounds, wherein the composition of the ethylenically unsaturated compounds comprises:

at least one monomer A, comprising only one ethylenic unsaturation which can undergo radical-mediated polymerization, giving the microparticles formed in the non-aqueous medium self-stabilization during and after polymerization, without any addition of polymer having the function of a stabilizing agent, either before, during or after polymerization, at least one compound B comprising at least two ethylenic unsaturations which can undergo radical-mediated polymerization, the compound B being different from an allylic(meth)acrylate and, optionally:

at least one compound C comprising only one ethylenic unsaturation which can undergo radical-mediated polymerization, which is different from A and/or at least one compound D which is different from A, B and C and comprising at least one ethylenic unsaturation which can undergo radical-mediated polymerization and at least one second reactive function f1 which is other than an ethylenic unsaturation.

2. The microparticles according to claim 1, wherein the monomer A is defined by the general formula (I) below:

$CH_2=CR_1-X-(R_2-Y)_k-R$ with $R_1$=H, $CH_3$

X=ester —(C=O)O—, amide —(C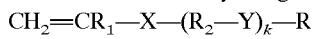O)N($R_3$)—

Y=ester —O(O=C)—, amide —($R_3$)N(C=O)—, urethane

—O(O=C)NH—

$R_2=C_2-C_6$ alkylene radical which can be substituted with functional groups such as OH $R_3=C_1-C_6$ alkyl, H K=0 or 1

R=linear or branched $C_8-C_{22}$ alkyl or alkenyl radical or $C_8-C_{22}$ aralkyl radicals substituted or unsubstituted on the aromatic ring, or substituted or unsubstituted $C_6-C_{22}$ acyclic, monocylic or polycyclic radical which can comprise a reactive function f2 selected from the group consisting of: carboxylic acid or anhydride, hydroxyl, epoxy, isocyanate and silane.

3. The microparticles of claim 1 wherein the composition of the ethylenically unsaturated polymerizable compounds comprises:

5–99 mol % of the monomer(s) A 0.02–30 mol % of the compound(s) B and, optionally:

0–80 mol % of the compounds C

0–80 mol % of the compound(s) D with the molar percentages of A and B and optionally of C and/or D chosen within the limits defined above, such that their sum is equal to 100 mol % relative to the composition of all of the polymerizable compounds present.

4. The microparticles of claim 1 wherein the monomer A is chosen from the group consisting of: isobornyl (meth) acrylate, norbornyl (meth)acrylate, lauryl (meth)acrylate, octadecyl (meth)acrylate, docosanyl (meth)acrylate, dicyclopentadienyl (meth)acrylate, cyclohexyl (meth)acrylate, 2-ethylhexyl (meth)acrylate, Cardura E10 (meth)acrylate or tridecyl (meth)acrylate and isodecyl (meth)acrylate.

5. The microparticles of claim 1 wherein the compounds B, C and D are monomers and/or oligomers and that the weight ratio between the sum of the polymerizable compounds and the non-aqueous solvent is between 10/90 and 50/50.

6. The microparticles of claim 1 wherein compound C is selected from the group consisting of: (meth)acrylic, vinylaromatic and vinyl ester monomers and (meth)acrylated oligomers with a number average molecular weight Mn of less than 2500.

7. Microparticles according to claim 6 wherein: (i) the (meth)acrylic monomers are selected from the group consisting of: methyl, ethyl, propyl, butyl and tert-butyl (meth) acrylates; (ii) the vinylaromatic monomers are selected from the group consisting of: styrene and vinyltoluene and; (iii) the (meth)acrylated oligomers are selected from (meth) acrylates of monofunctional alcohol oligomers with an Mn of less than 1500.

8. The microparticles of claim 1 wherein they bear reactive functions f1 borne by at least one compound D and/or reactive functions f3 introduced by at least partial chemical modification of the reactive functions f1 after the polymerization step.

9. The microparticles of claim 1 wherein the reactive functions f1 borne by at least one compound D are selected from the group consisting of: carboxylic acid and/or anhydride, hydroxyl, epoxy, isocyanate, silane, amine, and oxazoline, the functions f1 selected such that they cannot react with each other during the polymerization.

10. The microparticles of claim 9, wherein after chemical modification, following the polymerization step, these microparticles at least partially bear functions f3, formed by at least partial modification of the functions f1, selected from the group consisting of: acrylate, methacrylate, vinyl, ester or amide functions containing a $C_{12}-C_{22}$ unsaturated fatty chain, maleate and/or maleimide functions, ester functions derived from allylic alcohols or cycloaliphatic unsaturations based on dicyclopentadiene or on a tetrahydrophthalic ring, and carboxylic acid salts.

11. The microparticles of claim 1 wherein they comprise at the surface reactive functions f2 as defined in claim 2 and/or functions f4 obtained by suitable chemical modification of the functions f2, after polymerization.

12. The microparticles according to claim 11, wherein the functions f4 are selected from the group consisting of: acrylate; methacrylate; ester or amide functions containing a $C_{12}-C_{22}$ unsaturated fatty chain; maleate and/or maleimide functions; ester functions derived from allylic alcohols or cycloaliphatic unsaturations based on dicyclopentadiene or on a tetrahydrophthalic ring system; and carboxylic acid salts.

13. The microparticles of claim 1 wherein compound B is selected from the group consisting of: multifunctional (meth)acrylate monomers of functionality ranging from 2 to 6; substituted or unsubstituted divinylbenzene; (meth) acrylic multifunctional ester oligomers of functionality ranging from 2 to 50 and with an Mn of less than 2500; and combinations thereof.

14. The microparticles of claim 1 wherein compound B is selected from the group consisting of: di(meth)acrylates of ethylene glycol, of propylene glycol, of butanediol, of 2-methylpropanediol, of neopentyl glycol, of hexanediol, of zinc and/or of calcium; tri(meth)acrylates of trimethylopropane or of glycerol; tri- and/or tetra(meth)acrylates of pentaerythritol; penta- and/or hexa(meth)acrylates of dipentaerythritol; (meth)acrylic multifunctional esters of oligomeric polyols, with an Mn of less than 2500, based on (a) polyethers, comprising ether units chosen from oxyethylene and/or oxypropylene and/or oxytetramethylene, or (b) based on saturated polyesters or (c) based on polyurethanes, or unsaturated polyesters; and acrylic (meth)acrylated oligomers.

15. The microparticles of claim 1 wherein the polymerization is carried out in several successive steps, with compositions of polymerization compounds that are identical or different for each step.

16. The microparticles of claim 1 wherein the composition of the ethylenically unsaturated compounds comprises:
    0–30 mol % of octadecyl (meth)acrylate and/or 5–80 mol % of isobornyl (meth)acrylate as monomer(s) A
    0.02–30 mol % of hexanediol di(meth)acrylate as compound B
    0–50 mol % of styrene and/or of methyl and/or butyl or tert-butyl (meth)acrylate, as compound C
    0–50 mol % of glycidyl (meth)acrylate as compound D, with the molar percentages of A, B, C and D selected such that their sum is equal to 100% of the composition of the polymerizable compounds and with the glycidyl reactive functions possibly being at least partially modified by reaction with an ethylenically unsaturated acid or anhydride.

17. A process for preparing the crosslinked microparticles of claim 1 comprising a step of dispersion polymerization, in a non-aqueous medium which is a non-solvent for the polymer formed, of a composition of ethylenically unsaturated polymerizable compounds, wherein the polymerization step is carried out on a composition comprising:
    at least one monomer A, comprising only one ethylenic unsaturation which can undergo radical-mediated polymerization and giving the microparticles formed in the said non-aqueous medium self-stabilization during and after the polymerization, without any addition of polymeric stabilizing agent, either before, during or after the dispersion polymerization, the monomer A is grafted to the outer layer of the microparticles thus obtained
    at least one compound B comprising at least two polymerizable ethylenic unsaturations, the compound B being different from an allyl(meth)acrylate and optionally:
    at least one compound C, comprising only one polymerizable ethylenic unsaturation, which is different from A and/or
    at least one compound D which is different from A, B and C, comprising at least one polymerizable ethylenic unsaturation and at least one second reactive function f1 which is different from the ethylenic unsaturation.

18. The process according to claim 17, wherein the monomer A is defined by the general formula (I) below:

with $R_1$=H, $CH_3$
X=ester —(C=O)O—, amide —(C=O)N($R_3$)—
Y=ester —O(O=C)—, amide —($R_3$)N(C=O)—, urethane —O(O=C)NH—
$R_2$=$C_2$–$C_6$ alkylene radical which can be substituted with functional groups such as OH $R_3$=$C_1$–$C_6$ alkyl, H
k=0 or 1
R=linear or branched $C_8$–$C_{22}$ alkyl or alkenyl radical or $C_8$–$C_{22}$ aralkyl radicals substituted on the aromatic ring, or substituted or unsubstituted $C_6$–$C_{22}$ acyclic, monocyclic or polycyclic radical which can comprise a reactive function f2 selected from: carboxylic acid or anhydride, hydroxyl, epoxy, isocyanate, silane.

19. The process of claim 17 wherein the monomer A is chosen from the group consisting of:
    isobornyl (meth)acrylate, norbornyl (meth)acrylate, lauryl (meth)acrylate, octadecyl (meth)acrylate, docosanyl (meth)acrylate, dicyclopentadienyl (meth)acrylate, cyclohexyl (meth)acrylate and 2-ethylhexyl (meth)acrylate or Cardura E10 (meth)acrylate, tridecyl (meth)acrylate and isodecyl (meth)acrylate.

20. The process of claim 17 wherein the compounds B, C and D are monomers as defined in claim 1, and wherein the weight ratio between the sum of the polymerizable compounds A, B, C and D and the non-aqueous solvent is from 10/90 to 50/50.

21. The process of claim 17 wherein the non-aqueous medium comprises at least one solvent selected from $C_6$–$C_{10}$ alkanes and/or $C_3$–$C_5$ alkanols from hexanes, heptanes, cyclohexanes, octanes, nonanes, isopropanol, butanol and pentanol.

22. The process of claim 17 wherein the non-aqueous medium consists of a mixture of n-heptane/isopropanol in a weight ratio ranging from 0/100 to 75/25.

23. The process of claim 17 wherein the polymerization step is carried out after a prior step of dispersion, in the medium, of organic or inorganic microparticles which are insoluble in this medium, these microparticles being chosen from the group consisting of: (i) organic or inorganic pigments; (ii) organic or inorganic fillers or additives; (iii) microparticles according to claim 1 which are insoluble in this medium and (iv) combinations thereof.

24. The process of claim 17 further comprising an additional step of recovering the microparticles formed by evaporating the solvents.

25. The process of claim 17 wherein the polymerization step is carried out by continuous and/or batchwise addition of the composition of the polymerizable compounds in one or more successive steps, and with compositions introduced in each step, which may be identical or different from one step to another.

26. The process of claim 17 wherein the polymerization step is carried out by continuous addition of the polymerizable compounds and of at least the monomer A when the monomer A has substantially different reactivity relative to that of the other polymerizable compounds.

27. The process of claim 17 wherein when the monomer A has substantially different reactivity relative to that of the other polymerizable compounds, the polymerization step concerned is carried out in a batchwise manner under the condition that at least one second monomer A is present which has a reactivity such that the average reactivity of the monomers A is similar to the average reactivity of the other polymerizable compounds.

28. The process of claim 17 wherein when the composition of the polymerizable compounds comprises a compound D as defined in claim 1 a monomer A as defined in claim 1 and comprising a function f2 on the radical R, the process also comprises, after the polymerization step, an additional step of at least partially chemically modifying the reactive functions f1 into functions f3 and/or optionally of the reactive functions f2 into functions f4.

29. A coating or moulding composition comprising the microparticles of claim 1 as reactive or unreactive components.

30. Crosslinkable coating or moulding or composite compositions, wherein they contain the microparticles of claim 1 as rheology regulators and/or as reinforcing agents and/or flexibilizing agents or as multifunctional crosslinking agents.

31. The crosslinkable coating composition according to claim 30 which can be crosslinked by radiation in the presence of a radical-mediated and/or cationic photoinitiator or by a radical-mediated thermal initiator and/or by condensation.

32. The composition of claim 29 wherein different microparticles bear functions f1 and/or f2 and/or f3 and/or f4 which are different from each other but mutually reactive and which form a sole or predominant reactive system in the composition.

33. The process of claim 17 wherein the monomer A is grafted to the outer layer of the microparticles thus obtained.

34. The process of claim 21 wherein the non-aqueous medium comprises hexanes, heptanes, cyclohexanes, octanes, nonanes, isopropanol, butanol and pentanol.

35. Compositions according to claim 29, for use as:
protective varnishes, paints, adhesives, inks, composites, moulding or coating powders.

* * * * *

UNITED STATES PATENT AND TRADEMARK OFFICE
CERTIFICATE OF CORRECTION

PATENT NO.    : 6,586,097 B1
DATED         : July 1, 2003
INVENTOR(S)   : Jean-Pierre Pascault et al.

It is certified that error appears in the above-identified patent and that said Letters Patent is hereby corrected as shown below:

<u>Column 11,</u>
Line 64, replace "Theological" with -- rheological --.

<u>Column 16,</u>
Line 56, replace "$T^{onset} = 61°$ C." with -- $Tg^{onset} = 61°$ C. --

<u>Column 24,</u>
Line 29, replace "$[C\alpha C]=3.6 \times 10^{-4}$ mol/g." with -- "$[C=C]=3.6 \times 10^{-4}$ mol/g. --

<u>Column 29,</u>
Line 37, replace "-(C⊙O)N(R$_3$)-" with -- -(C=O)N(R$_3$)- --

Signed and Sealed this

Twenty-first Day of October, 2003

JAMES E. ROGAN
*Director of the United States Patent and Trademark Office*